United States Patent [19]

Tanaka et al.

[11] Patent Number: 4,608,656
[45] Date of Patent: Aug. 26, 1986

[54] ROAD MAP DISPLAY SYSTEM WITH INDICATION OF A VEHICLE POSITION

[75] Inventors: Haruto Tanaka; Kiyoshi Yamaki; Hidetaka Suzuki, all of Yokosuka, Japan

[73] Assignee: Nissan Motor Company, Limited, Japan

[21] Appl. No.: 365,105

[22] Filed: Apr. 2, 1982

[30] Foreign Application Priority Data

Apr. 13, 1981 [JP] Japan ................................. 56-54363

[51] Int. Cl.⁴ ...................... G01C 21/00; G06F 15/50
[52] U.S. Cl. .................................... 364/449; 340/988; 340/995; 364/424; 364/443; 364/521
[58] Field of Search ............... 364/424, 436, 443, 449, 364/460, 521, 522, 444; 340/24, 323, 988, 990, 995, 286 M, 727, 22; 343/5 CM, 5 MM

[56] References Cited

U.S. PATENT DOCUMENTS

| | | | |
|---|---|---|---|
| 3,899,662 | 8/1975 | Kreeger et al. | 364/424 X |
| 3,925,641 | 12/1975 | Kashio | 364/436 |
| 4,312,577 | 1/1982 | Fitzgerald | 364/424 X |
| 4,360,876 | 11/1982 | Girault et al. | 364/443 X |
| 4,366,475 | 12/1982 | Kishi et al. | 364/521 X |
| 4,400,727 | 8/1983 | Aron | 340/995 X |
| 4,402,050 | 8/1983 | Tagami et al. | 364/460 |
| 4,403,291 | 9/1983 | Von Tomkewitsch | 364/444 X |
| 4,416,066 | 11/1983 | Romacker | 33/318 |
| 4,428,057 | 1/1984 | Setliff et al. | 364/444 X |
| 4,484,192 | 11/1984 | Seitz et al. | 364/449 X |
| 4,484,284 | 11/1984 | Tagami et al. | 340/988 X |

FOREIGN PATENT DOCUMENTS

| | | |
|---|---|---|
| 0059435 | 9/1982 | European Pat. Off. |
| 237568 | 8/1926 | United Kingdom |
| 1065563 | 4/1967 | United Kingdom |
| 1077003 | 7/1967 | United Kingdom |
| 1337960 | 11/1973 | United Kingdom |
| 1452608 | 10/1976 | United Kingdom |
| 2059374 | 4/1981 | United Kingdom |
| 2068546A | 8/1981 | United Kingdom |
| 2087086A | 5/1982 | United Kingdom |
| 2092301A | 8/1982 | United Kingdom |

*Primary Examiner*—Errol A. Krass
*Assistant Examiner*—Edward R. Cosimano
*Attorney, Agent, or Firm*—Lane and Aitken

[57] ABSTRACT

A road map display system for an automotive vehicle displays a mark representative of a vehicle's position and direction. The mark is positioned at the center of a display screen and the coordinate system of the map is transformed depending on the vehicle's direction so that the mark indicative of the direction is always directed upward along the y-axis of the display. The system further includes a scale selector which is manually operable. Depending on the selected map scale, the displayed map is magnified or reduced.

13 Claims, 26 Drawing Figures

ROAD MAP DISPLAY SYSTEM WITH INDICATION OF A VEHICLE POSITION

BACKGROUND OF THE INVENTION

The present invention relates generally to a road map display system for displaying a rod map and a vehicle driven on the road on a screen. More particularly, the invention relates to a road map display system displaying a vehicle at the center of the display screen and a road map which is displaced on the screen according to the movement of the vehicle.

A display system for displaying the road may and the vehicle position on the displayed road is helpful for the vehicle driver to find his way. A pilot system for a ship is disclosed in the first publication of the Japanese Patent Application Sho 52-159894 (Tokkai Sho 54-89767, published July 17, 1979). In this publication there is shown a method for displaying a sea chart with an indication of the ship position. The sea chart is moved on the display according to the travelling distance and travelling direction of the ship. In this system, coordinates of the displayed sea chart are modified with respect to the ship position and travelling direction of the ship. The sea chart is stored in a digital memory as plotted coordinates. A microcomputer is used for processing modifications of the sea chart coordinate system and for calculation of the ship position based on a sensor, which measures travelling distance and detects the ship direction.

On the other hand, in the automotive vehicle field, Tokkai Sho 52-141662, published on Nov. 26, 1977 shows a map display system for the automotive vehicle. In this system, a microfilm is used to store the map. In this system, the indication of the vehicle position will move in accordance with the travelling distance and vehicle direction.

The present invention is an application of an improvement upon the map display system of the foregoing Tokkai Sho 54-88767 to display a road map for the automotive vehicle driver. For example, the road map display system displays the map in various scales in order to show small roads or small side streets in a town and to alternatively show a wide or larger scale map for use in the country.

SUMMARY OF THE INVENTION

Therefore, it is an object of the present invention to provide a road map display system for an automotive vehicle which can display the map on more than one scale.

Another and more specific object of the invention is to provide a road map display system capable of modifying the coordinates of each point on the map in accordance with the vehicle position and map scale.

According to the principle of the invention, a road map display system for an automotive vehicle displays a mark representing the position and the forward direction of the vehicle at a predetermined position on a display panel and is so designed that the map displayed on the display panel is moved in accordance with the actual driving position and direction of the vehicle.

The road map display system comprises a selection means for selecting the magnification at which to display the map from among a plurality of predetermined display magnifications and means for enlarging or reducing the map to be displayed in accordance with the magnification selected.

The road map display system includes means for selecting a predetermined magnification whenever the vehicle approaches to within a predetermined range of a position marked previously on the map such as a crossing or intersection.

To achieve the above-mentioned and other objects of the invention, a drive map display system for an automotive vehicle comprises:

a first memory storing road map data therein, which road map data are defined in terms of a first coordinate system of a map, a sensor detecting displacement of the vehicle from a starting point and producing a first signal representative of vehicle position with respect to said first coordinate system, a scale selector for varying the scale of the map stored in the first memory, said scale selector producing a second signal representative of the selected scale of the map, means for transforming the map data in said first memory in response to the first and second signals for producing map data defined in terms of a second coordinate system, a second memory for storing the transformed map data and a display unit displaying the road map in conjunction with a mark representing the vehicle, said transforming means cooperating with said display unit for varying the displayed map in relation to the vehicle mark on the display unit according to displacement of the vehicle from the starting point.

BRIEF DESCRIPTION OF THE DRAWINGS

The invention will be understood more fully from the detailed description given herebelow and from the accompanying drawings of the preferred embodiment of the present invention, which, however, should not be taken as limiting to the invention but for explanation or elucidation only.

In the drawings.

DESCRIPTION OF THE PREFERRED EMBODIMENT

Figure 1:
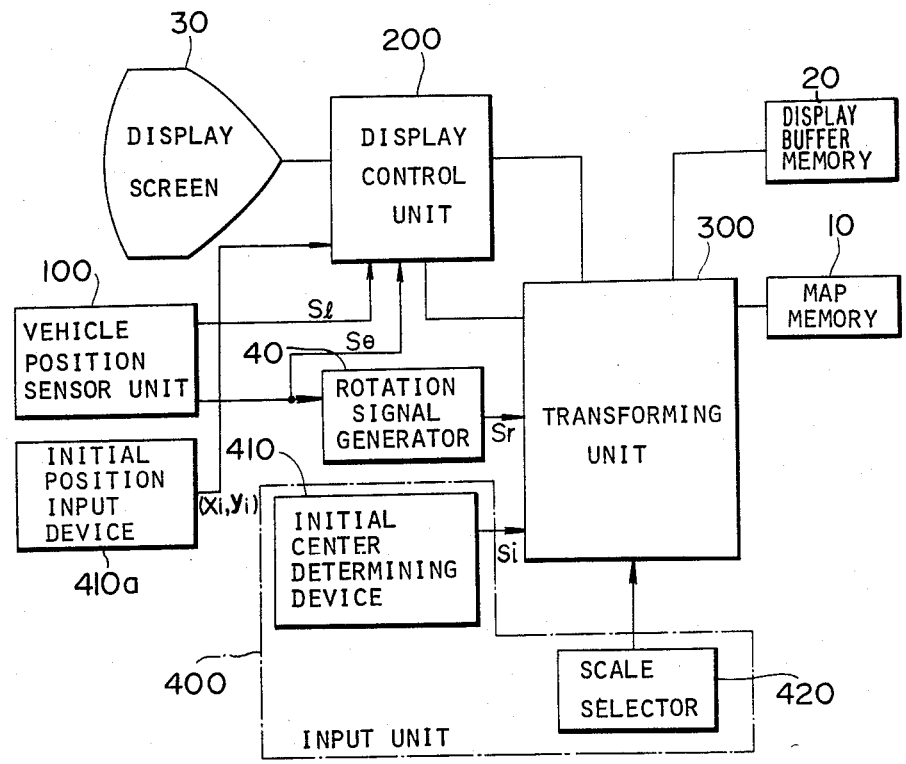
FIG. 1 is a schematic block diagram of the first embodiment of a drive map display system according to the present invention.

Referring now to the drawings, FIG. 1 illustrates the structure of the preferred embodiment of a drive map display system according to the present invention. A road map is stored in a map memory 10. The map memory 10 is a digital memory unit for storing digitalized map data. Each map datum represents a corresponding point on a road map. The map data in the map memory 10 is transferred to a display memory 20 via a coordinate system transforming unit 300. The display buffer memory 20 is adapted to temporarily store map data that is to be displayed on a display screen 30. The data stored in the display buffer memory 20 is read out and transferred to a display control unit 200 via the transforming unit 300. The display control unit 200 controls transfer of map data from the map memory 10 to the display buffer memory 20 and from the display buffer memory 20 to the display screen 30. In this description, a "point" may be, alternatively, a pixel on a display screen or a locus on a road map.

A vehicle position sensor unit 100 is connected to the display control unit 200. The vehicle position sensor unit 100 is adapted to detect the distance travelled by the vehicle from a starting point and its direction of travel with respect to the coordinate axes of the map stored in the map memory. The vehicle position sensor unit 100 produces a travelling distance signal $S_l$ and a travelling direction signal $S_\theta$ respectively having values representative of the distance travelled by the vehicle and orientation of the vehicle with respect to the map coordinates. The vehicle position sensor unit 100 is further connected to a rotation signal generator 40 which receives the travelling direction signal $S_\theta$. The rotation signal generator 40 produces a rotation signal $S_r$ corresponding to the signal $S_\theta$ and suitable for input into the transforming unit 300 for providing the display with coordinate axes aligned with the vehicle orientation. The rotation signal $S_r$ is fed to the transforming unit 300 for processing the map data in the display buffer memory 20 to adapt the data to be displayed on the display screen by shifting the y-axis of the map orientation system to the vehicle direction in response to the rotation system $S_r$.

The transforming unit 300 is further connected to an input unit 400 including an initial center determining device 410 and a scale selector 420 for determining the reduction scale of the map to be displayed. The initial center determining device 410 may comprise a pair of joy sticks for controlling cursors, one of which is movable in the vertical direction on the display screen for determining the y-coordinate of the vehicle position in the map in the map memory, and the other of which is movable in the horizontal direction on the display screen to determine the x-coordinate of the vehicle position. With the initial center determined by the initial center determining device 410 and the vehicle direction detected by the vehicle position sensor unit 100, the transforming unit 300 can derive the coordinate system of the display in relation to the coordinate axes of the map in the map memory.

In practice, the vehicle position is taken as the origin of the display so that the initial center determining device 410 serves to enter data corresponding to the initial position of the vehicle relative to the map coordinates stored in the map memory 10. More generally, however, a separate input initial center determining device similar to device 410 may be used to input the initial vehicle position which may be different from the origin of the display. Such an initial position input device is shown in the block 410a connected directly to the display control unit 200.

The transforming unit 300 sequentially transforms the coordinates of the map data in order to convert the map data to the determined display coordinate system for display on the display screen 30. As the vehicle moves, the vehicle position sensor unit sequentially produces the traveling distance signal $S_l$ and the travelling direction signal $S_\theta$ according to the vehicle movement. The display control unit 200 receives the travel distance signal $S_l$ and the travelling direction signal $S_\theta$ and processes them to determine the coordinates of the current vehicle position. The display control unit 200 produces a vehicle position signal $S_v$ representative of the x-coordinate and the y-coordinate of the vehicle in the display coordinate system at given intervals. The vehicle position signal $S_v$ thus contains a x-component and a y-component respectively representative of the x-coordinate ($x_v$) and y-coordinate ($y_v$) of the vehicle position and is fed to the transforming unit 300. The transforming unit 300 also receives the rotation signal $S_r$ from the rotation signal generator 40. Based on the vehicle position signal $S_v$ and rotation signal $S_r$, the transforming unit 300 calculates displacement of the display center and shifts the display axes and rotates the axes to orient the y-axis of the coordinates to the vehicle travelling direction. According to the translation and rotation of the display axes the map data is transformed by the transforming unit 300 in each given interval.

In the embodiment shown, the display buffer memory 20 is provided with memory addresses for storing the transformed data corresponding to the map as viewed from the vehicle position generally fixed at the center of the display. The map memory 10 stores the data for the entire map. This data is not changed during operation of the system so that the data is only read out therefrom. Of course, however, the map memory may be initially set to represent the desired city or area of interest. Each address in the map buffer memory 10 and display buffer memory 20 stores display data values in the form of bits representing points on the map. In the preferred embodiment, the center of the display map is taken as the vehicle position so that the map coordinates of the vehicle position $(x=x_v, y=y_v)$ are the coordinates of the display center $(x'=0, y'=0)$, and the y'-axis of the display map is aligned with respect to the vehicle travelling direction. The fixed y-axis of map memory 10 is aligned with true north so the angle $\theta$ between y and y' is also the orientation angle of the vehicle with respect to true north. Coordinates of each point on the map stored in the map memory 10 can be transformed into display coordinates (see, for example, FIGS. 11 and 19) by the following equation:

$$x_z' = (x_a - x_v) \cdot \cos\theta - (y_a - y_v) \cdot \sin\theta$$

$$y_a' = (x_a - x_v) \cdot \sin\theta + (y_a - y_v) \cdot \cos\theta$$

where $x_a'$ and $y_a'$ respectively represent x-' and y-' coordinates of points on the display and $x_a$ and $y_a$ respectively represent x- and y-coordinates of a point on the map.

When the scale of the displayed map is to be changed, the scale selector 420 of the input unit 400 is operated. The scale selector 420 produces a scale signal $S_k$ representative of the desired map scale to be displayed. The scale signal $S_k$ is fed to the transforming unit 300. Here, assuming the original displayed map scale is $k_1$ and the desired map scale is $k_2$, the coordinates of each point of the displayed map can be obtained from:

$$x_a'' = \frac{k_2}{k_1} \{(x_a - x_v) \cdot \cos\theta - (y_a - y_v) \cdot \sin\theta\}$$

$$= \frac{k_2}{k_1} \cdot x_a'$$

$$y_a'' = \frac{k_2}{k_1} \{(x_a - x_v) \cdot \sin\theta + (y_a - y_v) \cdot \cos\theta\}$$

$$= \frac{k_2}{k_1} \cdot y_a'$$

where $x_a''$ and $y_a''$ are respective x- and y-coordinates of the display map converted to the desired scale $k_2$ from the original scale $k_1$.

Figure 2:
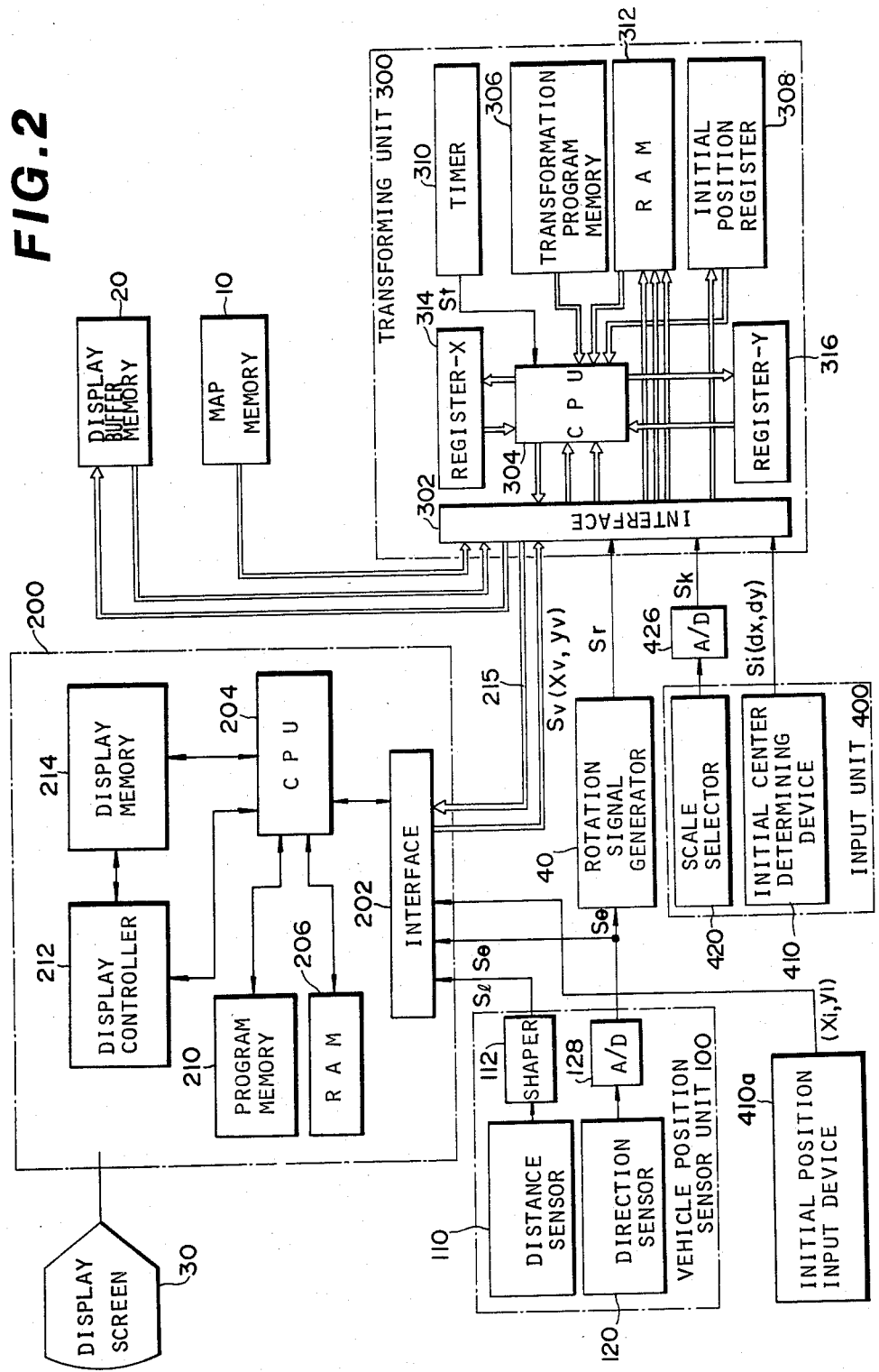
FIG. 2 is a block diagram of the drive map display system of FIG. 1 and showing more detail thereof.

Referring to FIGS. 2 to 21, the preferred embodiment of the road map display system according to the present invention is set forth will be described in more detail hereinbelow. FIG. 2 shows a detailed circuit diagram of the road map display system of FIG. 1. The vehicle position sensor unit 100 comprises a distance sensor 110 and a direction sensor 120. The distance sensor 110 may be positioned adjacent the vehicle axle (or a wheel of the vehicle) for generating a pulse for each fixed amount of rotation of the vehicle axle. The pulse signals are fed to a signal shaper 112 and subsequently to the display control unit 200. The signals from the shaper 112 are vector summed to give an indication of the vehicle travel distance. On the other hand, the direction sensor 120 can comprise any of a number of appropriate devices such as geomagnetic compass, gyrocompass, gyroscope or so forth. Examples of the types of travelling direction sensor specifically suitable for automotive use is set forth in the SAE Paper SP-80/458/S02.50, published by Society of Automotive Engineering, as No. 800123 written by H. Ito et al or 3-axis Rate Gyro Package Parts No. PG24-N1, illustrated in an Instructional Manual thereof of K. K. Hokushin Denki Seisakusho, February, 1979, both of which references are incorporated hereby by reference. In the former reference, two coil sensors are used to general Vx and Vy component direction signals. The y-coil may be aligned with vehicle direction so that the angle $\theta$, given by the arctangent $(v_x/v_y)$ is representative of the direction of the vehicle relative to magnetic north. An A/D converter 128 is used to digitize the signals $v_x$ and $v_y$, which signals are collectively represented in FIG. 2 by $S_\theta$.

As shown in FIG. 2, the travelling distance signal (pulses) $S_l$ and the travelling direction signal $S_\theta$ are inputted to an interface 202 and stored in RAM 206 by a CPU 204. The CPU 204 operates under program control to calculate the distance traveled by vector-summing the distance pulses with respect to the direction data from $S_\theta$. It may be assumed that for relatively small distances, the direction data $S_\theta$ is constant so that the sum of, for example, ten successive $S_l$ pulses may be assumed to represent a fixed $S_\theta$. The CPU 204 thus calculates the angle data $\theta$ from the signals $S_\theta$ and then performs the following sums over a fixed, small number of $S_l$ pulses, $$x_v = x_i + \Sigma S_l \cdot \sin\theta$$

$$y_v = y_i + \Sigma S_l \cdot \cos\theta$$

where $(x_i, y_i)$ represents the initial map position of the vehicle, input via the initial position input device 410a and $(x_v, y_v)$ represents the current position of the vehicle. The sum value is added to the initial value and a new sum value is derived using an updated $\theta$ and the new value is added to the previously calculated $(x_v, y_v)$ etc so that the vehicle position may be maintained current. Based on the result of vehicle position calculation, the central processing unit 204 produces a signal representative of the coordinates $(x_v, y_v)$ of the current vehicle position in the map coordinate system, which signal is hereinafter referred to as the vehicle position signal $S_v$. The vehicle position signal $S_v$ is fed to the transforming unit 300 via the interface 202. The vehicle position signal $S_v$ is then inputted to an interface 302 of the transforming unit 300. A rotation signal $S_r$ representative of rotational angle of the display axes determined by the rotation signal generator 40 based on the travelling direction signal $S_\theta$ is inputted to the interface 302. In response to the vehicle position signal $S_v$ and the rotation signal $S_r$, a central processing unit 304 of the transforming unit 300 executes a transformation program memory 306 which is stored in a transformation memory (ROM) 306. To the transforming unit 300, a signal representative of the initial center coordinates is inputted via the initial display center determining device 410, which signal is referred to hereafter as $S_i$. The signal $S_i$ is fed to an initial position register 308 in the transforming unit 300 via the interface 302. Generally the initial center $S_i$ is the same as the initial vehicle position since it is the most convenient to center the display about the vehicle position.

The central processing unit 304 is associated with a timer 310 and periodically executes the transformation program in accordance with the formulas set forth above. The transformed data is stored in display buffer memory 20 and is periodically updated to account for the current vehicle position. The address locations of display buffer memory 20 correspond to the address locations of display memory 214 in the display control unit 200.

Figure 3:
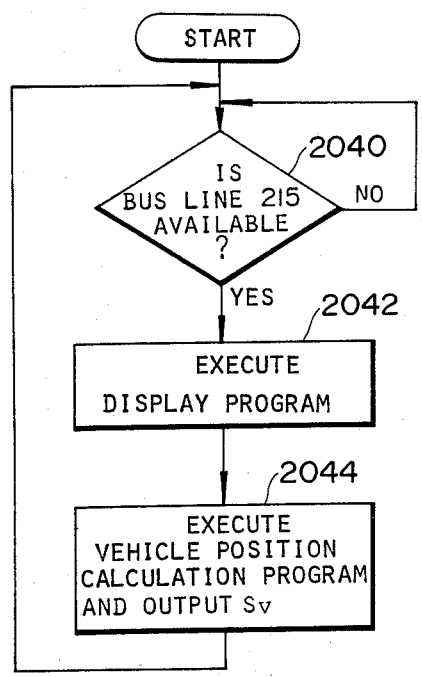
FIG. 3 is a flowchart of the operation of a display control unit in the drive map display system of FIG. 1.
Figure 4:
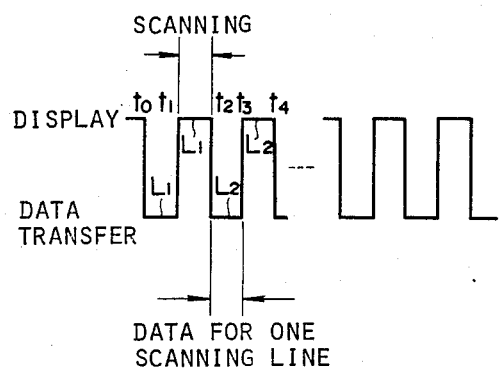
FIG. 4 is a timing chart showing timing of transfers of map data.

The operation of the display control unit 200 will be described herebelow with reference to FIGS. 3 to 5. FIG. 3 shows a flow chart of the operation of the central processing unit 204. In the first block 2040 after starting, bus line 215 is checked to see if it is busy. If it is busy, the program loops to repeatedly check bus line 215 at the block 2040 until the bus line 215 is available. When the bus line 215 is available, the display program in the program memory 210 is executed at a block 2042. By executing the display program, transformed map data is transferred to the display buffer memory 214 from display buffer memory 20 and the data is displayed on the display screen 30. The display on screen 30 and data transfer operation from display buffer memory 20 to display memory 214 may be interleaved line by line so as to update the display memory 214 without producing visual interference on the display screen 30. FIG. 4 shows the timing of such a line-by-line operation. Between time $t_0$ and $t_1$ the first display line $L_1$ of data is transferred from the display buffer memory 20 to the display memory 214 via interface 302, bus line 215, interface 202 and CPU 204. This data is stored in buffer memory 214 and displayed by the display controller 212 during the time period between $t_1$ and $t_2$. The process is repeated for $L_2$ transfer during the time period between $t_2$ and $t_3$ and $L_2$ display during the time period between $t_3$ and $t_4$.

Alternately, the data transfer between display buffer memory 20 and display memory 214 can take place without interleaving the display.

Returning to FIG. 3, after execution of the block 2042, the central processing unit 204 executes the vehicle position calculation program at a block 2044. The vehicle position calculation program generally processes the travelling distance signal $S_l$ and travelling direction signal $S_\theta$ to obtain the coordinates $S_v(x_v, y_v)$ of the vehicle position on the map according to the foregoing vector sum equations. Thereafter, the program in FIG. 3 returns to the initial block 2040.

Figure 5:
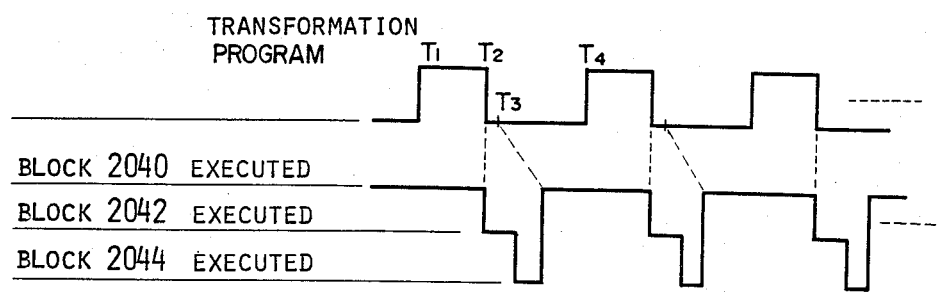
FIG. 5 is a timing chart showing the relationship of the display control unit operation and a transformation program executed in a transforming unit of FIG. 1.

The execution of the programs in the central processing unit 204 of the display control unit 200 and the operation of the central processing unit 304 of the transforming unit 300 may be illustrated by a timing chart as shown in FIG. 5. The timing of the central processing unit operation in transforming unit 300 is controlled by the timer 310. During the time period between $T_1$ and $T_2$, the CPU 304 calculates the coordinates of the display data $(x_a', y_a')$ for each point $(x_a, y_a)$ of the map and the calculated display data is transferred to display buffer memory 20. The transformation program is executed in CPU 304 following which the CPU 204 proceeds to execute steps 2042 and 2044 (see FIG. 3) during the time interval between $T_2$ and $T_3$. Generally the time interval between $T_2$ and $T_3$ is much smaller than the data transformation time $T_1-T_2$, and thus it is shown expanded in FIG. 5. Although not shown, plural cycles of operation of the flowchart of FIG. 3 may be carried out between intervals $T_2$ and $T_4$. In order to prevent the execution by CPU 204 of steps 2042 and 2044 during the data transformation program of CPU 304, the bus line 215 is closed (kept in a "busy" state) while the central processing unit 304 of the transforming unit 300 executes the transformation program. As long as the bus line 215 is closed, the central processing unit 204 loops at step 2040 to repeatedly check the bus line 215. The bus line 215 is opened by CPU 304 upon completion of its current calculation and the data transfer to display buffer memory 20. When the bus line 215 is opened, the display program as set forth is executed in the central processing unit 204 during the interval between $T_2$ and $T_3$. At the time $T_4$ the CPU 304 reads current input data $(S_v, S_r, S_k)$ and performs the map transformation to display coordinate data transformations.

Figure 6:
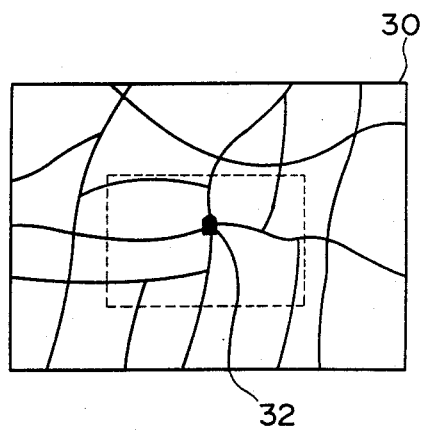
FIG. 6 shows an original map stored in a map memory and displayed on a display screen without transformation.
Figure 7:
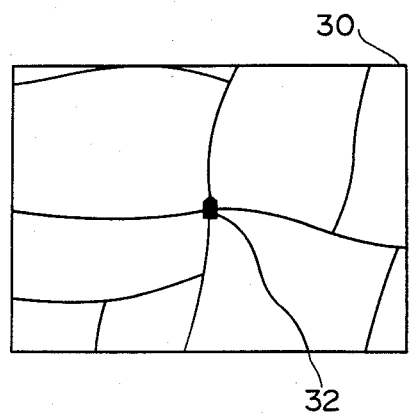
FIG. 7 shows the map defined by the broken line in FIG. 6 as it is displayed on the display screen in enlarged form.
Figure 8:
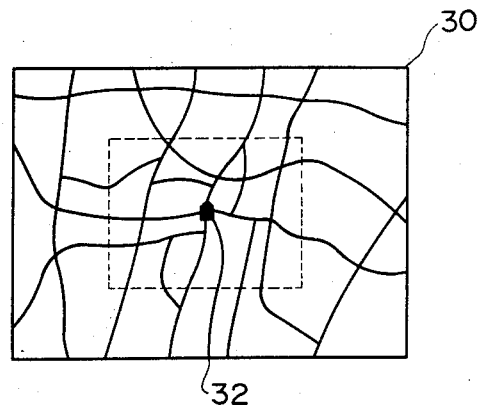
FIG. 8 shows the map on the display screen which is scaled-down from the map of FIG. 7.

The coordinate transformation and scale variations are explained with reference to FIGS. 6 to 10. For example, as shown in FIG. 6, a mark 32 representing the vehicle is fixedly displayed at the center of the display screen 30 and the apex of the mark 32 indicates the forward direction of the vehicle. When the map displayed is enlarged or expanded at a predetermined magnification by the operation of the scale selector 420, the area defined by the broken line in the displayed map is enlarged or scaled up about the mark 32 as the central point of the enlargement as shown in FIG. 7. Alternatively, when the map displayed in FIG. 6 is reduced or scaled down, the reduced map is displayed as the area defined by the broken line in FIG. 8. The map can be arbitrarily rescaled within the limitations of the predetermined scale conversion factors.

The general aspects of the change of scale of the map to be displayed according to the present invention will be explained hereinbelow.

Figure 9:
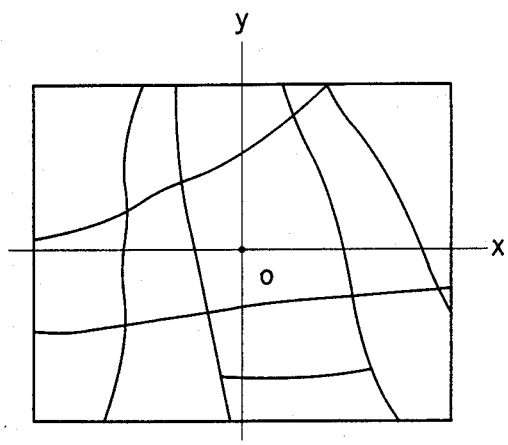
FIG. 9 shows the coordinate system of the original map.
Figure 10:
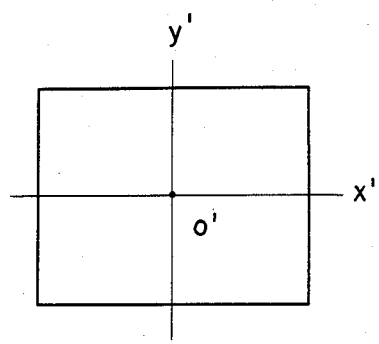
FIG. 10 shows the coordinate system of the display screen.

Now assuming that the map information stored in the map memory 10 is the information shown in FIG. 9, this map information is stored as data at memory addresses corresponding to the coordinates of points on the map, wherein coordinates $x=0$ and $y=0$ are taken as the origin O and the north-south axis is taken as the y-axis of the map as shown in FIG. 9. The display screen is arranged as shown in FIG. 10 such that vehicle coordinates $(x_v, y_v)$ are taken as the center of the display screen 30, i.e., as the original O'. The map origin O $(x=0, y=0)$ is fixed. The display screen origin O' $(x'=0, y'=0)$ is translated and the display axes x' and y' are rotated with respect to the coordinates axes x and y in accordance with the location and orientation of the vehicle.

Figure 11:
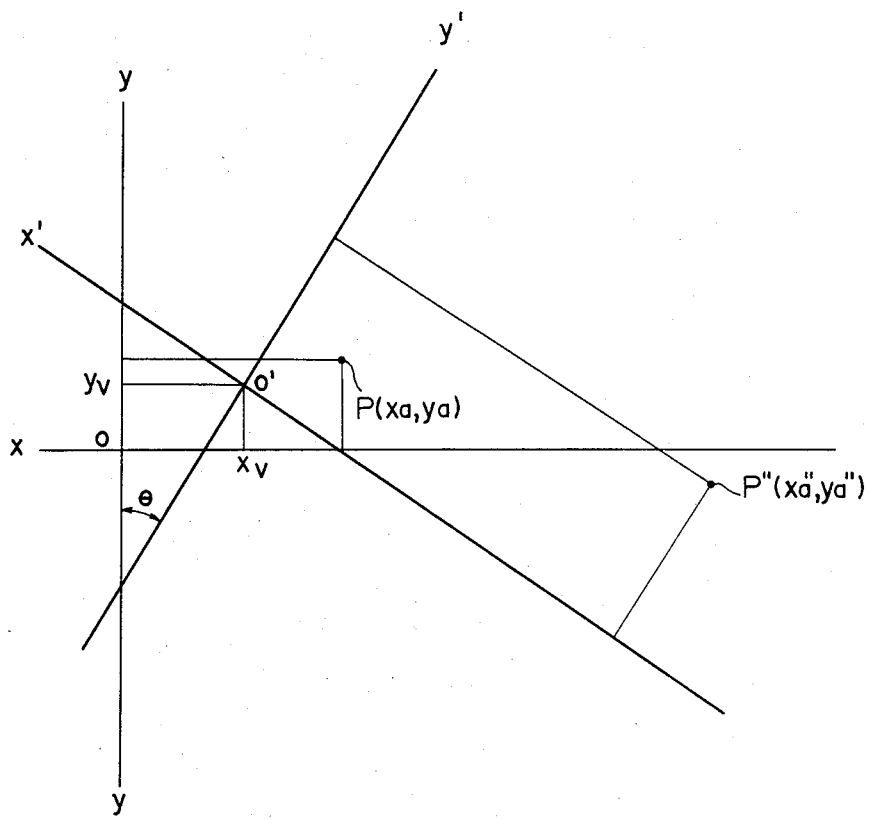
FIG. 11 illustrates the relationships among the coordinate systems.

FIG. 11 shows display axes x' and y' superimposed on map axes x and y with a rotation angle $\theta$ therebetween.

Given that the map coordinates of Point P are P $(x_a, y_a)$, the display coordinates of P, P$(x_a', y_a')$ are given by the following equations:

$$x_a' = (x_a - x_v) \cdot \cos\theta - (y_a - y_v) \cdot \sin\theta$$

$$y_a' = (x_a - x_v) \cdot \sin\theta + (y_a - y_v) \cdot \cos\theta$$

If the center for enlarging or reducing the display is taken to be O' and the display scale is to be reduced by the factor "k", the display coordinates of point P, P'$(x_a', y_a')$ will be transformed to P''$(x_a'', y_a'')$ where $k=\overline{O'P''}/\overline{O'P'}$.

Here, assuming the original map scale is $k_1$ and the selected scale is $k_2$, the coordinates are transformed by the following equations:

$$x_a'' = (k_2/k_1)\{(x_a - x_v) \cdot \cos\theta - (y_a - y_v) \cdot \sin\theta\}$$

$$y_a'' = \{(k_2/k_v) \cdot \sin\theta + (y_a - y_v) \cdot \cos\theta\}$$

Figure 12:
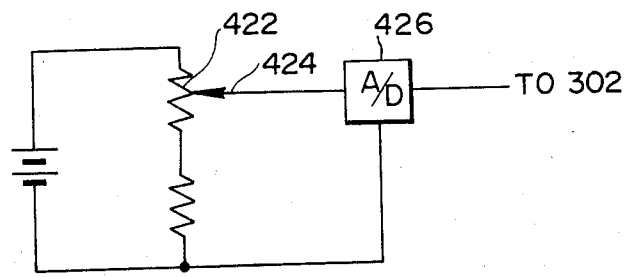
FIG. 12 is a circuit diagram of a scale selector in the drive map display system of FIG. 1.
Figure 13:
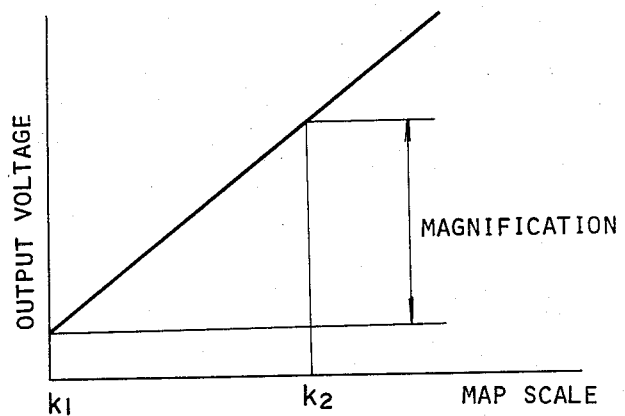
FIG. 13 is a graph illustrating the variation of output voltage of the scale selector of FIG. 12 with respect to the map scale.

FIG. 12 shows a circuit diagram for the scale selector 420 in the input unit. The scale selector 420 generally comprises a variable resistor 422. A movable contact 424 movably associated with the variable resistor 422 is manually operable. The keyboard may also be utilized for inputting the magnification data. Preferably, the magnifications of the map scale are preset in relation to the original map scale. As shown in FIG. 13, the magnification of the map to be selected is proportional to the output voltage of the variable resistor of FIG. 12. Therefore, the scale selector 420 produces the scale signal $S_k$ having a value representative of the output voltage of the variable resistor 422. Since the output voltage of the variable resistor 422 is an analog signal, an analog/digital converter (A/D) 426 is connected between the scale selector 420 and the interface 302 of the transforming unit 300.

While the central processing unit 304 executes the transformation program, the bus line 215 is maintained busy to prevent the central processing unit 204 of the display control unit 200 from executing the display program and the vehicle position calculation program.

The rotation signal $S_r$ is inputted from the rotation signal generator 40 through the interface 302 to the transforming unit 300 and stored in the RAM 312. The vehicle position signal $S_v$ indicative of the vehicle coordinates $(x_v, y_v)$ in the map coordinate system is also inputted to the transforming unit 300 from the display control unit 200 via the interface 202 and bus line 215 via the interface 302 and is stored in the RAM 312. The scale signal $S_k$ is also fed to the transforming unit 300 and stored in the RAM 312.

The coordinates transformation program stored in the coordinates transformation program memory 302 is periodically read out and executed by the central processing unit 304 in response to the timing signal $S_t$ produced by the timer 310.

Figure 14:
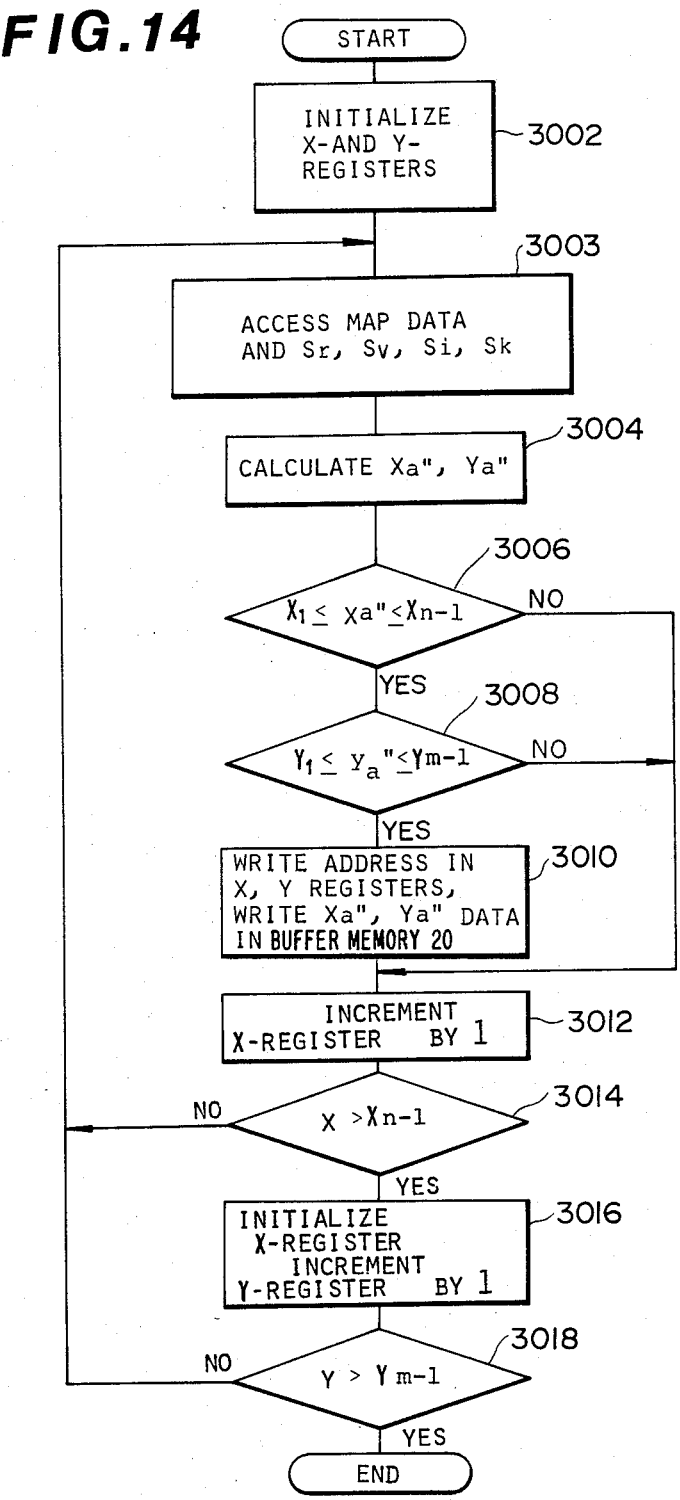
FIG. 14 is a flowchart of a transformation program to be executed in the transformation unit of FIG. 1.

At the first block 3002 in FIG. 14, X-register 314 and Y-register 316 in the coordinates transforming unit 300 are cleared. Then, at a block 3003, data for each of the points on the map in the map memory 10 are read out in order. At the same time, the initial center data $d_x$ and $d_y$ stored in the initial position register 308 in response to the initial position signal $S_i$, scale data represented by the scale signal $S_k$, vehicle position coordinates $(x_v, y_v)$ represented by the signal $S_v$ and the rotation of the display axes with respect to the map axes represented by the rotation signal $S_r$ are read out. The central processing unit 304 then processes the data in response to these signals according to the following equations:

$$x_a'' = (k_2/k_1)\{(x_a - x_v) \cdot \cos\theta - (y_a - y_v) \cdot \sin\theta\} - d_x$$

$$y_a'' = (k_2/k_1)\{(x_a - x_v) \cdot \sin\theta + (y_a - y_v) \cdot \cos\theta\} - d_y$$

Thereafter, at a block 3006, the X-register 314 is checked to see if the obtained value $x_a''$ is in a range $x_1' - x_a'' - x_{n-1}'$, where $x_{n-1}'$ are points on the far left and far right portions of the x'-axis. If the obtained x''-coordinate $x_a''$ is within the range, the obtained y''-coordinate $y_a''$ is checked, at a block 3008, to see if the obtained value $y_a''$ is within a range $y_1' - y_a'' - y_{m-1}'$, where $y_1'$ and $y_{m-1}'$ are similar points on the far upper and far lower portions of the y'-axis. If the condition in block 3008 is satisfied, the coordinates $(x_a'', y_a'')$ are written in the X-register 314 and Y-register 316 and the map data is transferred to the corresponding address in display buffer memory 20 at block 3010.

After the block 3010, the value of the X-register 314 is incremented by 1 at block 3012 and its contents, the value X is checked to see whether it is larger than $x_{n-1}$ at the next block 3014. If the condition in block 3014 is satisfied, the value X is initialized and content of the Y-register is incremented by 1 at block 3016. Then the value Y content of the Y-register is checked to see whether it is larger than $y_{m-1}$ at a block 3018, and if so the coordinates transformation program ends.

If the condition of either one of the blocks 3006 and 3008 is not satisfied, the program step jumps to the block 3012 to increment the value X and to proceed to block 3014.

In this case, the addresses $(x_a'', y_a'')$ are not written in the X- and Y-registers 314 and 316. When the condition in the block 3014 is not satisfied, the program step returns to the block 3003 to repeat the operation of the blocks 3004 to 3014. When the value X becomes greater than $(n-1)$, the row in the display buffer memory 20 shifts to the next adjacent row which corresponds to the register value Y being incremented by 1 and the register value X being initialized to restart the data transforming operation from the first column in the next row of the display memory address, at the block 3016. If the condition in the block 3018 is not satisfied, the program step returns to 3003 to process transforming operation for the next row.

Thus, by execution of the transformation program in the transformation program memory 306, the map data in the display buffer memory 20 is updated. As shown in FIG. 5, in response to the end of the transformation program the bus line 215 opens to permit the map data in the display memory 20 to be transferred to update the map data in the display memory 214 in the display control unit 200 as shown in FIG. 4.

Figure 15:
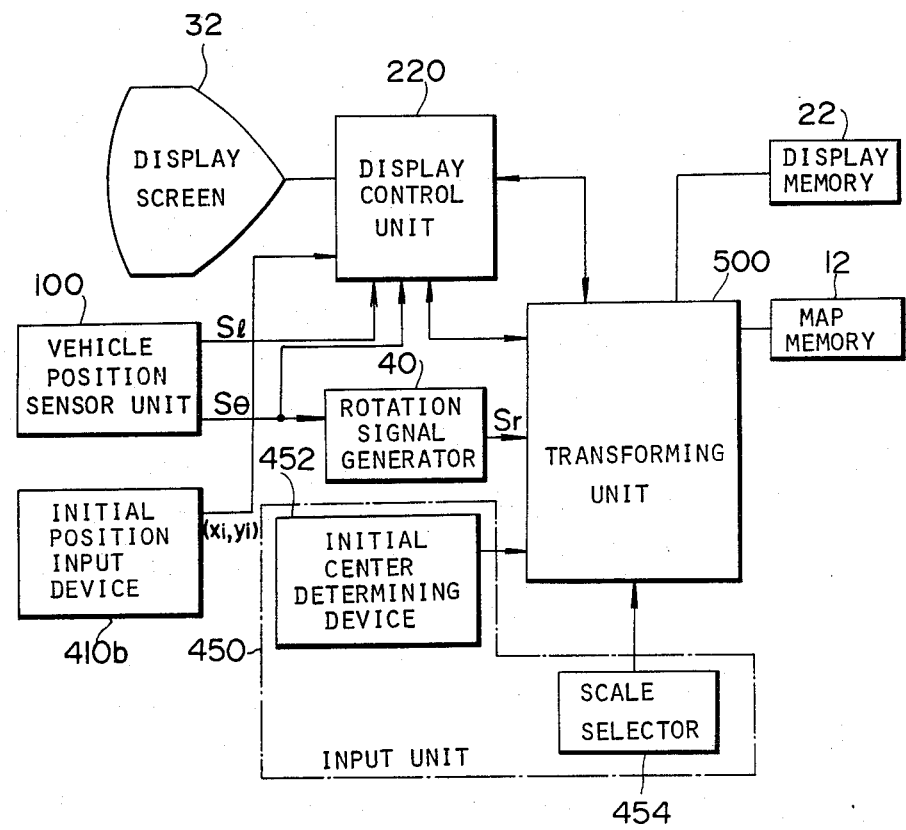
FIG. 15 is a schematic block diagram of the second embodiment of the drive map display system according to the present invention.

FIG. 15 illustrates the general structure of another embodiment of a drive map display system according to the present invention. In this embodiment, the transforming unit using the microcomputer in the foregoing embodiment is replaced by an alternate transforming unit 500. Otherwise the components of FIG. 15 are similar to the corresponding components of FIG. 1.

As in the embodiment of FIG. 1, the road map is stored in a map memory 12. The map data in the map memory 12 is transferred to the display buffer memory 22 via a transforming unit 500. The display buffer memory 22 is adapted to temporarily store the map data to be displayed on a display screen 32. The data stored in the display buffer memory 22 is read out and transferred to a display control unit 220 via the transforming unit 500. The display control unit 220 controls transfer of map data from the map memory 12 to the display buffer memory and display of the transformed data on the display screen 32.

A vehicle position sensor unit 100 is connected to the display control unit 220. The vehicle position sensor unit 100 is adapted to detect the distance travelled by the vehicle from a starting point and the orientation of the vehicle with respect to coordinate axes of the map stored in the map memory 12. The vehicle position sensor unit 100 produces a pulsed distance signal $S_l$ and a direction signal $S_\theta$ representing speed and orientation respectively. The vehicle position sensor unit 100 is also connected to a rotation signal generator 40 to feed thereto the travelling direction signal $S_\theta$. The rotation signal generator 40 produces a rotation signal $S_r$ which is fed to the transforming unit 500 for processing the map data in the display buffer memory 22 to adapt the data to be displayed on the display screen 32 by shifting the map y-axis to reflect the vehicle direction.

The transforming unit 500 is further connected to an input unit 450 including an initial display center determining device 452 and a scale selector 454 for determining the scale of the map to be displayed. With the initial display center determined by the initial display center determining device 452 and the vehicle direction detected by the vehicle position sensor unit 100, the transforming unit 500 sequentially determines the coordinates of points on the map as it is to be displayed on the screen in relation to the axes of the map in the map memory 12. As the vehicle moves, the vehicle position sensor unit repeatedly produces the distance pulses $S_l$ and the direction signal $S_\theta$. The display control unit 220 receives the distance signal $S_l$ and the direction signal $S_\theta$ and processes them to determine the coordinates of the current vehicle position. The display control unit 220 produces a vehicle position signal $S_v$ representative of the x-coordinate and the y-coordinate of the vehicle on the display coordinate system at given intervals. The vehicle position signal $S_v$ thus contains an x-component and a y-component respectively representative of the x-coordinate ($x_v$) and y-coordinate ($y_v$) of the vehicle position and is fed to the transforming unit 500. The transforming unit 500 also receives the rotation signal $S_r$ from the rotation signal generator 42. Based on the vehicle position signal $S_v$ and rotation signal $S_r$, the transforming unit 500 performs a data transformation to displace the display center and thereby shift the display coordinate system and rotate its axes to align the y-axis of the coordinate system with the vehicle travelling direction.

Details of the circuitry and function of the transforming unit 500 will be illustrated herebelow with reference to FIGS. 15 to 21.

Figure 16:
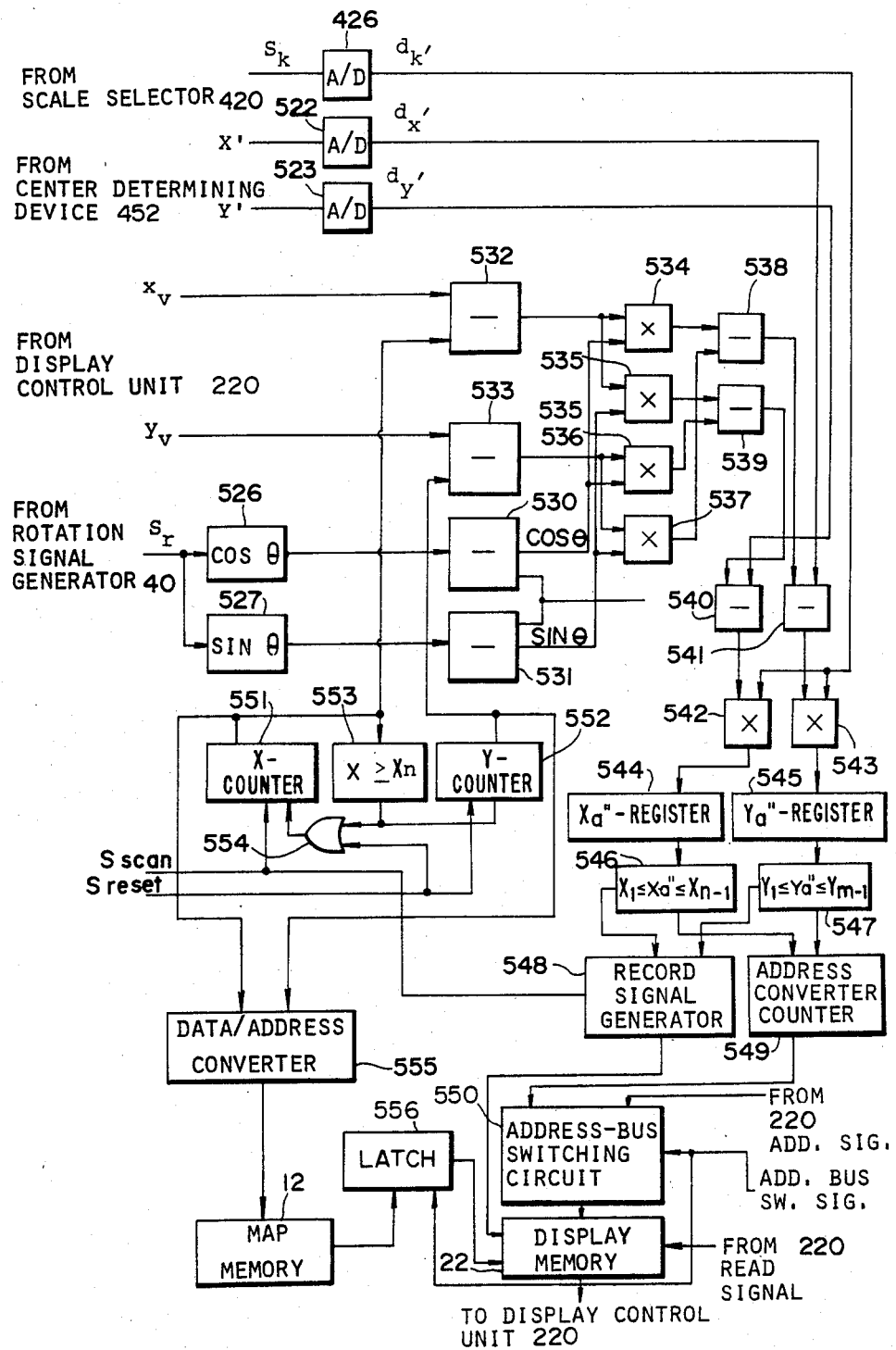
FIG. 16 is a block diagram of the transforming unit in the drive map display system of FIG. 15.

FIG. 16 is a block diagram showing details of the circuitry of the transforming unit 500 of FIG. 15.

A number of signals are generated for input into the transforming unit 500. These include the scale signal $S_k$ of the scale selector 454 representing the scale of the map to be displayed and determining whether the map display should be enlarged or reduced, a center signal $S_c$ with components $X'$ and $Y'$ that determines the center of the map to be displayed relative to the fixed center of the map stored in map memory 12, and the vehicle position signal $S_v(x_v, y_v)$ representing the position of the vehicle determined by the display control unit 220. Since the scale signal $S_k$ is an analog signal, it is converted into digital signal $d_k$ through A/D converter 426. Likewise, the center signal $S_c$ is an analog signal and is analog/digital converted through A/D converters 522 and 523 to form digital signals $d_x'$ and $d_y'$. The rotation signal $S_r$ represents the map rotation angle $\theta$ is separated into $\cos \theta$ and $\sin \theta$ components by a cosine generator 526 and a sine generator 527. The multiplied signals $\cos \theta$ and $\sin \theta$ generator signals are respectively decremented by an offset value in subtractors 530 and 531 so that the corrected digital values of $\cos \theta$ and $\sin \theta$ are obtained.

Figure 17:
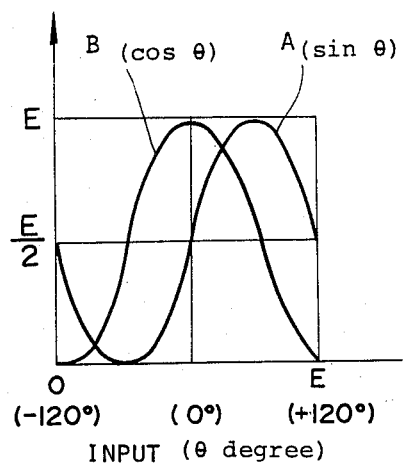
FIG. 17 shows an offset angle of sin $\theta$ and cos $\theta$ respectively produced by the sine signal generator and the cosine signal generator in the drive map display system of FIG. 16.

The cosine generator 526 and sine generator 527 have input-output characteristics shown in the graphs in FIG. 17. The characteristics of the curves A ($\sin \theta$) and B ($\cos \theta$) can be generated by a square wave approximation circuit employing diodes. Since the curves A and B are offset from zero by E/2, the corrected $\cos \theta$ and $\sin \theta$ can be obtained by subtracting the digital value corresponding to E/2 in the subtractors 530 and 531 after their digital conversion.

Referring to FIG. 16 again, subtractors 532 and 533 calculate $(x_a - x_v)$ and $(y_a - y_v)$ in the equation:

$$x_a'' = k\{(x_a - x_v) \cos \theta - (y_a - y_v) \sin \theta - d_x'\}$$

$$y_a'' = k\{(x_a - x_v) \sin \theta - (y_a - y_v) \cos \theta - d_y'\}$$

The resulting values are calculated by multipliers 534, 535, 536 and 537, respectively, so that $(x_a - x_v) \cos \theta$, $(x_a - x_v) \sin \theta$, $(y_a - y_v) \cos \theta$ and $(y_a - y_v) \sin \theta$ are obtained. In the next stage, subtractors 538 and 539 output $$\{(x_a - x_v) \cos \theta - (y_a - y_v) \sin \theta\}$$

$$\{(x_a - x_v) \sin \theta - (y_a - y_v) \cos \theta\}$$

Further, subtractors 540 and 541 calculate:

$$x_a' = \{(x_a - x_v) \cos \theta - (y_a - y_v) \sin \theta - d_x'\}$$

$$y_a' = \{(x_a - x_v) \sin \theta - (y_a - y_v) \cos \theta - d_y'\}$$

Multipliers 542 and 543 multiply the resulting values of the magnification factor $k$ of the desired scale to obtain $x_a''$ and $y_a''$ in the foregoing equation.

The position data ($x_a''$, $y_a''$) in the display coordinate system enlarged or reduced by multipliers 542 and 543 are subsequently stored in an $x_a''$ register 544 and a $y_a''$ register 545, respectively. Next, the position data $x_a''$ and $y_a''$ are checked by limit circuits 546 and 547 respectively as to whether the obtained or transformed data $x_a''$ and $y_a''$ are within the extent of the display screen having "m" rows and "n" columns of points. Only the values of ($x_a''$, $y_a''$) falling within the limits of the display screen are converted to addresses in the display buffer memory 22 by an address convertor 549 so as to specify the address in the display buffer memory 22 through an address-bus switch circuit 550.

Further, when the limit circuits 546 and 547 recognize that the point ($x_a''$, $y_a''$) lies within the limits of the display screen, a recording signal generator 548 outputs a command to record the data at the address in the display buffer memory 22 which is specified by the address signal from the address convertor 549.

On the other hand, in order to read out the data from the map memory 12, there is a read-out means comprising an X-counter 551 which counts scanning pulses $S_{scan}$ occurring at a constant frequency and outputs data $x_a$, a discriminator 553 which discriminates whether the number $x_a$ coincides with a predetermined value and outputs a pulse when the number coincides with the predetermined value, a Y-counter 552 which counts the pulses outputted from the discriminator 553 and outputs a data $y_a$, and an OR-gate 554 which resets the X-counter 551 when the pulse outputted from the discriminator 553 or a reset pulse $S_{reset}$ is received. The Y-counter 552 is also reset by the reset pulse $S_{reset}$.

Figure 18:
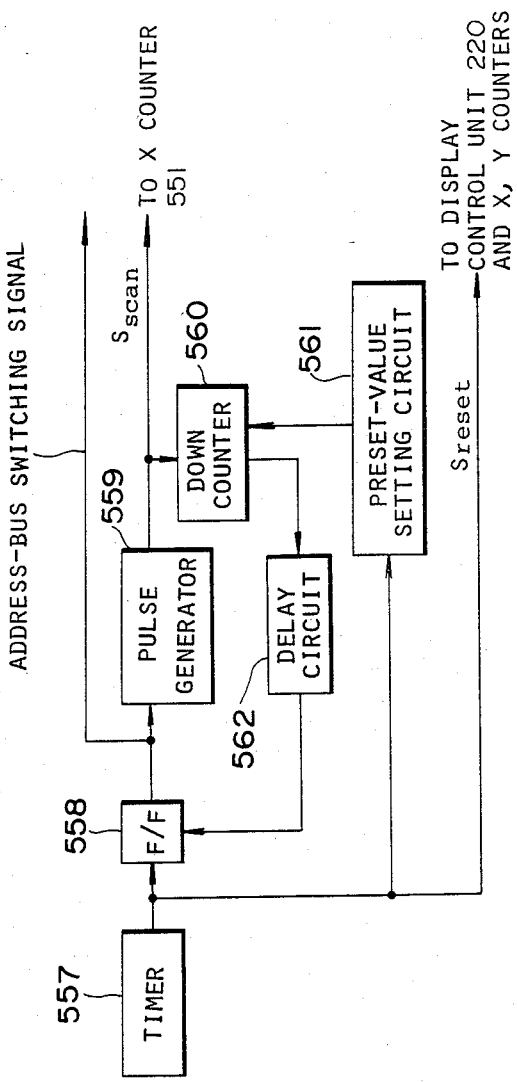
FIG. 18 is a block diagram of a timing control circuit associated with the transforming unit of FIG. 17.

A means for generating the reset pulse $S_{reset}$ and the scanning pulse $S_{scan}$ to read out the data stored in the map memmory 12 is constructed as shown in FIG. 18.

Referring to FIG. 18, the reference numeral 557 denotes a timer which generates a pulse signal which switches at regular intervals between a mode for transforming and recording the data stored in the map memory 12 into the coordinates of the display buffer memory 22, and another mode for displaying the data stored in the display buffer memory 22 on the display screen 32. Accordingly, a flip-flop 558 is actuated by the output pulse from the timer 557, thereby switching between the transforming and recording modes. Alternatively, the flip-flop 558 is reset by the output pulse, thereby switching to the mode for displaying. Whenever the flip-flop 558 is actuated, it outputs a signal as an address-bus switching signal to the address-bus switch circuit 550 and a detector latch 556 for detecting and latching the data to be displayed so as to allow for the recording to the data from the map memory 12 into the display buffer memory 22 at the address specified by counters 546 and 545. In this manner the data bits of the map memory 12 are stored at addresses which correspond to the transformed coordinates ($x_a''$, $y_a''$). The data in display buffer memory 22 is thus effectively translated and rotated with respect to the data in map memory 12.

A pulse generator 559 is actuated by the set output from the flip-flop 558, thereby generating a plurality of scanning pulses $S_{scan}$ with a constant period, which are sent to X-counter 551 for counting through all the coordinates of the display screen 32. A down-counter 560 counts down the value set by a preset value setting circuit 561 (when the display screen has "m" rows and "n" columns, the set value is "m×n−1") in accordance with the scanning pulses $S_{scan}$. When the counted value coincides with zero, a signal is sent to a delay circuit 562 which outputs a pulse which is delayed by a predetermined period to the flip-flop 558 so as to reset it and switch to the mode for displaying. The predetermined delay period in the delay circuit 562 permits time for completion of the recording of the data in the display buffer memory 22.

Transformation of the coordinates in the transforming unit 500 will be explained with reference to FIG. 19.

Figure 19:
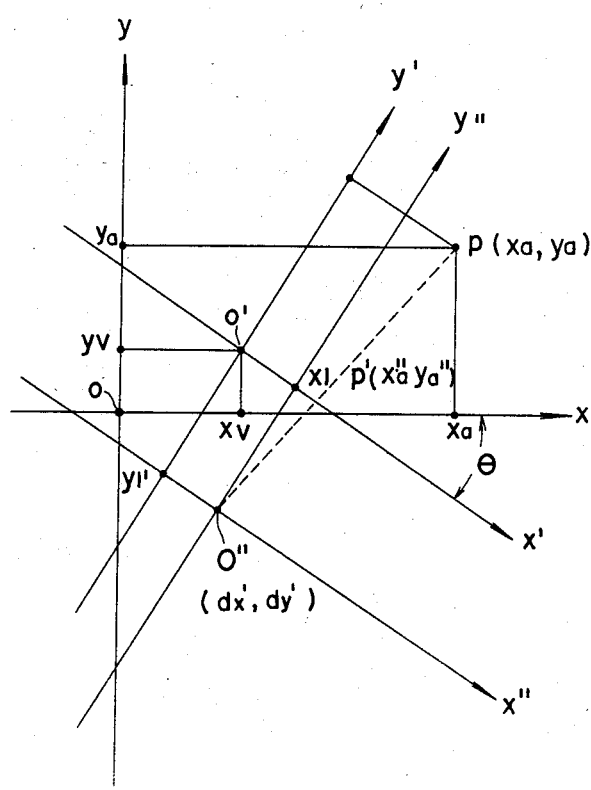
FIG. 19 illustrates the relationships among the coordinate systems.

FIG. 19 shows the map axes (x, y) and the display axes (x', y') overlapping and intersecting at the rotation angle $\theta$.

The coordinates of the point P, P($x_a$, $y_a$), are transformed into the display coordinates P($x_a'$, $y_a'$) given by the following equations:

$$x_a' = (x_a - x_v) \cos \theta - (y_a - y_v) \sin \theta$$

$$y_a' = (x_a - x_v) \sin \theta - (y_a - y_v) \cos \theta$$

where ($x_v$, $y_v$) is the vehicle position taken as the origin for the axes (x', y').

Then, if the center for enlarging or reducing the display scale is to be O" and the display scale is reduced by the factor "k", the point P'($x_a'$, $y_a'$) will be transformed to P"($x_a''$, $y_a''$).

If the center O" of the reduced-scale area with respect to the display coordinates ($x_a'$, $y_a'$) is centered at coordinates ($d_x'$, $d_y'$), the coordinates ($x_a''$, $y_a''$) of the O" point will be represented by the following equations:

$$x_a'' = k(x_a' - d_x')$$

$$y_a'' = k(y_a' - d_y')$$

Then, the equation (1) is substituted into the above equation, and the following equations are obtained:

$$x_a'' = k\{(x_a - x_v) \cos \theta - (y_a - y_v) \sin \theta - d_x'\}$$

$$y_a'' = k\{(x_a - x_v) \sin \theta + (y_a - y_v) \cos \theta - d_y'\}$$

The operation of the embodiment shown in FIG. 16 will be explained by showing an example in which the vehicle is at the center of the reduced-scale area.

Figure 20:
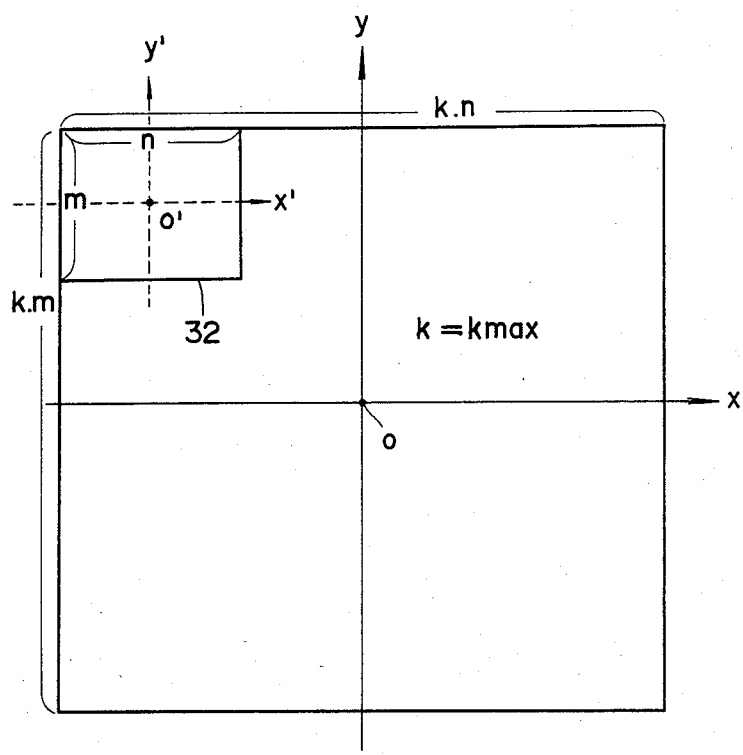
FIG. 20 is a schematic illustration of the relationship between the capacity of a map memory and a display memory in the embodiment of FIG. 15.

First of all, the relationship among the map memory 12, the display buffer memory 22 and the display screen 32 of "m" rows and "n" columns will be explained as follows. The memory capacity of the map memory 12 is sufficiently large to include many different screens for a display screen 32 of "m" rows and "n" columns corresponding to the capacity of the display buffer memory 22, as shown in FIG. 20. The map memory 12 outputs data corresponding to each of the "m×n" positions surrounding the vehicle position serving as the center of the desired display so that the display buffer memory 22 can read out the data stored therein and output signals to display the data on the Braun-tube.

Figure 21:
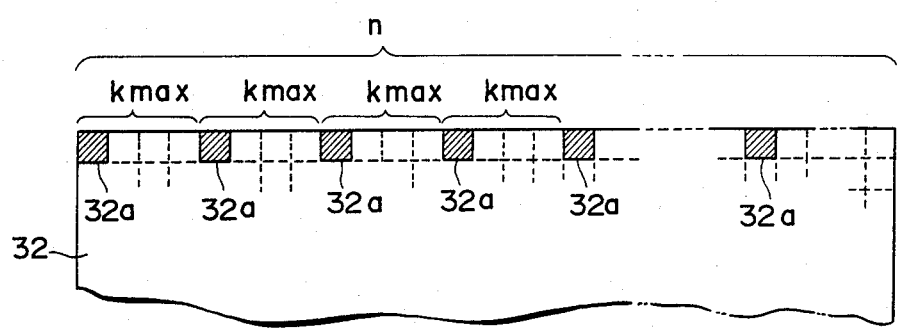
FIG. 21 is a schematic illustration showing display spots in the enlarged display screen.

When the display screen 32 is subjected to enlargement, each pixel 32a (the minimum display element) of the display screen 32 is dispersed, as shown in FIG. 21. The magnification for enlarging the map should be limited to a sufficient degree that the enlarged display would be recognizable to the naked eye as the map display even when the pixels 32a are dispersed.

Since the vehicle position is located at the center for the reduced scale, the signals $d_x'$ and $d_y'$ from the A/D converters 522 and 523 correspond to the origin of the display coordinate system.

Now, if the flip-flop 558 is set by the output pulse from the timer 557 as shown in FIG. 18, the mode for transforming and recording the data is effected and the address-bus switching signal generated in accordance with the set output of the flip-flop 558 makes the address-bus switch circuit 550 select the output from the address converter 549 and simultaneously actuates the detector latch 556. Further the scanning pulse $S_{scan}$ is applied to the X-counter 551.

Whenever the X-counter 551 counts the scanning pulse $S_{scan}$, the counted coordinate data $x_a$ is applied to an address converter 55 so the address converter 555 converts the data into the address information for the map memory 12 in conjunction with the counted coordinate data $y_a$ from the Y-counter 552 which is applied to the address converter 555 at the same time. Thus, the map information (display and color information) stored in the specific address in the map memory 12 can be read out.

Furthermore, the counted data $x_a$ and $y_a$ from the X-counter 551 and Y-counter 552 are respectively inputted into the subtractor 532 and 533 so as to subtract the data on the vehicle position from the position data on the map coordinates, thereby resulting in ($x_a - x_v$) and ($y_a - y_v$). Then, in each of the multipliers 534 to 537, the subracted data are each multiplied by $\cos \theta$ and $\sin \theta$ signals corresponding to the rotation signal $S_r$ between the map coordinates and the display coordinates. Finally, the multiplied data are enlarged at the magnification k in the multipliers 542 and 543, respectively, so that the address data $x_a''$ and $y_a''$ which are transformed from the map coordinates to the display coordinates and enlarged are stored in the display coordinates register 544 and the display coordinates register 545. These address data $x_a''$ and $y_a''$ are checked by the limit circuits 546 and 547, respectively. When the address data are within the permitted limits, the data are converted into the address data for the display buffer memory 22 by the address converter 549, and simultaneously the memory recording signal generator 548 is actuated so as to generate a pulse for recording. In response to this pulse, the display data read out from the map memory 12 and detected by the detector latch 556 are recorded in the specified address in the display buffer memory 22 by the address-bus switch circuit 550.

The above procedure is repeated to record the data into the display buffer memory 22 whenever the x coordinates counter 551 counts a scanning pulse $S_{scan}$. When the data stored in the all addresses of the map memory 12 are completely read out, the X-counter 551 and the Y-counter 552 are reset by the application of the reset pulse $S_{reset}$. The map data which is enlarged by the magnification factor k and centered at the vehicle position is thereby stored in the display buffer memory 22.

When the reset pulse $S_{reset}$ is outputted, the address-bus switch circuit 550 is switched to connect to the display control unit 220 of FIG. 15 so that the address indication signal is inputted from the display control unit 220. Thus, the data stored in the display buffer memory 22 is read out so that the map represented by that data which is enlarged by magnification factor k and centered on the vehicle position, is displayed on the Braun-tube display screen of "m" rows and "n" columns. The reset signal of FIG. 18 is sent to the display control unit 220 which, in response thereto, generates address signals fed to the address-bus switching circuit 550 and a read signal fed to the display buffer memory 22.

Though the operation explained above concerns a map enlarged by magnification factor k and centered on the vehicle's position, the map can be also reduced by changing the magnification factor.

Figure 22:
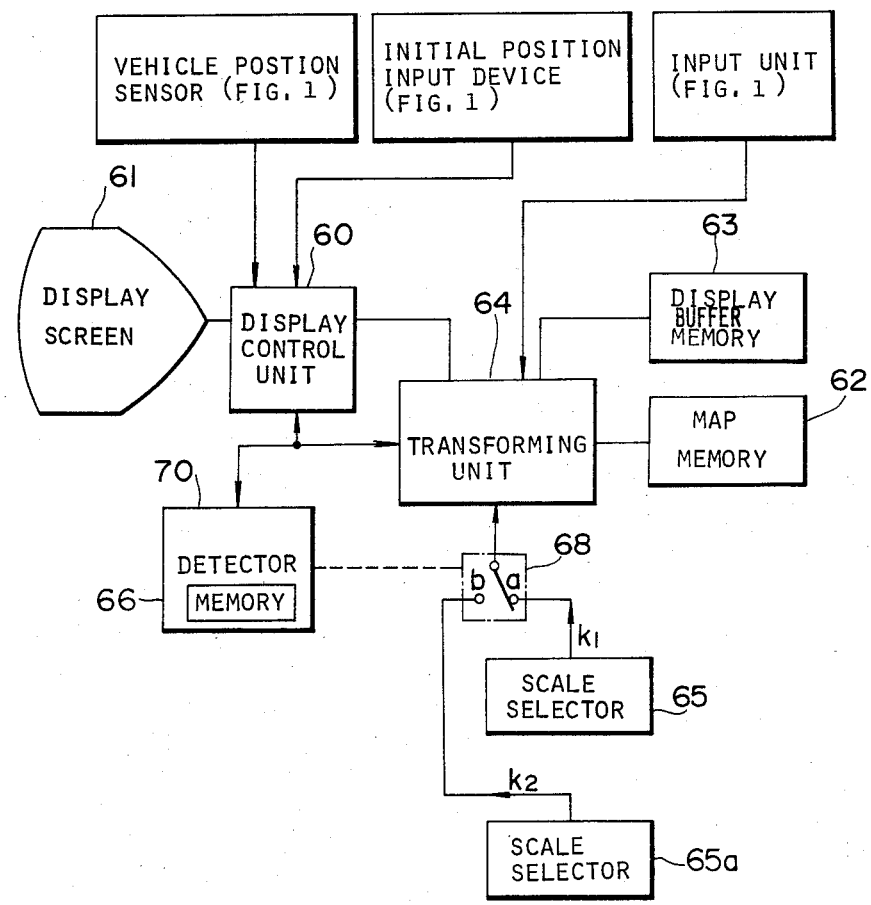
FIG. 22 is a block diagram showing an embodiment of the present invention which detects a crossing of roads and enlarges the map display.

FIG. 22 shows the other embodiment of the present invention, which is so designed that the display map is automatically enlarged by detecting when the vehicle comes near a predetermined point, such as a predetermined road crossing. That is, in addition to the device as shown in FIG. 1, this embodiment further comprises a memory 66 in which data representing the crossing position in the map coordinates are stored, a detector 70 for detecting when the difference between the cross position coordinates stored in the memory 66 and the vehicle position data obtained by the display control unit 60 is below a predetermined value, and a switching means 68 which switches a magnification signal $k_1$ determined by the scale selector 65 to a magnification signal $k_2$ for enlarging the map according to the output from the detector 70 so that the signal $k_2$ is applied to the unit 64 for transforming coordinates systems.

Figure 23:
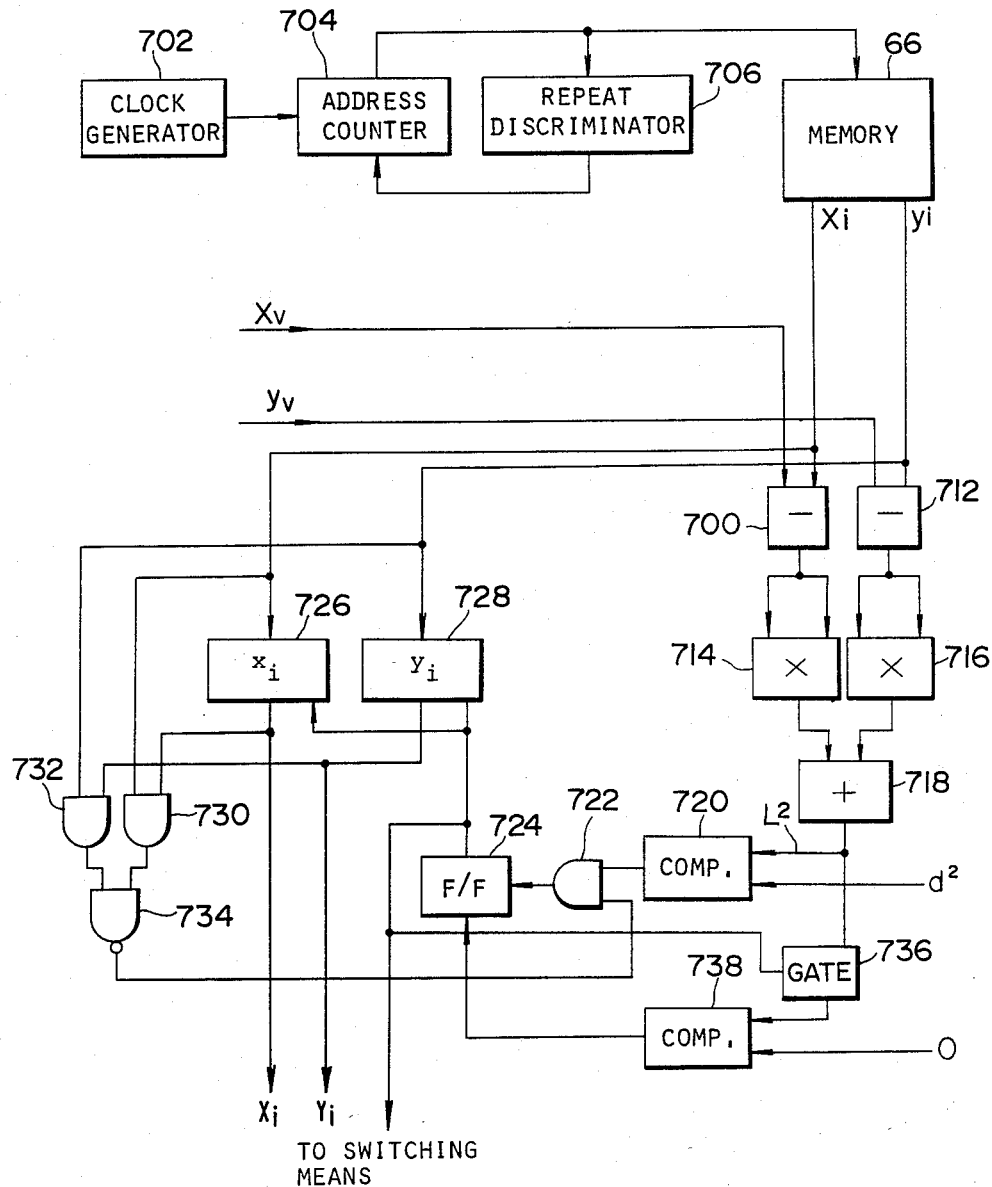
FIG. 23 is a block diagram showing an embodiment of the detector for detecting the crossing in FIG. 22.

The detector 70 in FIG. 22 has the structure shown in FIG. 23.

Referring to FIG. 23, a clock-generator 702 generates a clock-pulse by which an address counter 704 is incrementally actuated. According to the count address of the address counter 704, the data on crossings $x_i$ and $y_i$ (i=the index of the crossing such as 1, 2, 3, - - -) stored in the memory 66 is sequentially read out. Means, such as a keyboard or joy stick (such as used in the initial position input device of FIG. 1) may be provided for inputting into memory 66 only those major crossings or intersections of interest. A repeat discriminator 706 monitors the address data from the address counter 704 so as to discriminate the final crossing address data of the memory 66 and send a reset signal to the address counter 704 to allow repeated access to the crossing data. Signals $x_v$ and $y_v$ representing the current position of the vehicle are fed to subtractors 700 and 712 to subtract them from the data $x_i$ and $y_i$ so as to obtain differences $(x_i-x_v)$ and $(y_i-y_v)$, respectively. The resulting differences are respectively squared by multipliers 714 and 716 and then, the resulting values are added by an adder 718 so that $L^2=(x_i-x_v)^2+(y_i-y_v)^2$ is obtained. Then, the resulting value is compared with a predetermined value $d^2$ by a comparator 720. When comparison shows that $L^2 \leq d^2$, the comparator 720 generates a H-level output and sets a flip-flop 724 through an AND gate 722. In response to the set output from the flip-flop 724, the data $x_i$ and $y_i$ on the crossing is latched by $x_i$ register 726 and $y_i$ register 728, respectively. A circuit comprising two AND gates 730 and 732 and a NAND gate 734 is provided as an auxiliary circuit for the latch-control of the $x_i$ register 726 and $y_i$ register 728. That is, when the contents latched by the $x_i$ register 726 and the $y_i$ register 728 are not equivalent to the data $x_i$ and $y_i$ from the memory 66, the NAND gate 734 will be at H-level so as to allow the AND gate 722 to conduct. In response to this actuation, the H-level output from the comparator 720 is applied to the flip-flop 724 so that the input data is latched by the $x_i$ register 726 and by $y_i$ register 728.

Thus, when the flip-flop 724 is set by the output from the comparator 720, this set signal is outputted to the switching means 68 as a switch signal. The data $x_i$ and $y_i$ latched by the $x_i$ register 726 and the $y_i$ register 728 are outputted as crossing data.

Further, the set output from the flip-flop 724 allows AND gate 736 to operate so that the data $L^2$ outputted from the adder 718 is inputted into a comparator 738 which discriminates whether the condition $L^2 \leq 0$ is satisfied. The comparator 738 generates an output when $L_2 \leq 0$ is realized; i.e., when the position of the vehicle coincides with the position of the crossing of roads. The output signal from the comparator 738 resets the flip-flop 724 so as to return the map display scale to the initial magnification factor so that the detector is prepared for detecting the next crossing.

Alternatively, when the data representing the same crossing already passed is read out again from the memory 66 within a predetermined distance from the passed crossing, the calculated data $L^2$ by the adder 718 will show the relation formula $L^2 \leq d^2$. However, in this situation, since the latched contents (outputs) of the $x_i$-register 726 and the $y_i$-register 728 will coincide with the input data $x_i$ and $y_i$ so that the output from the NAND gate 734 will be L-level, the AND gate 722 will be rendered non-conductive so that the output of H-level from the comparator 720 will not be applied to the flip-flop 724. Accordingly, this detector is so designed that the same data is not latched after passing the crossing.

Figure 24:
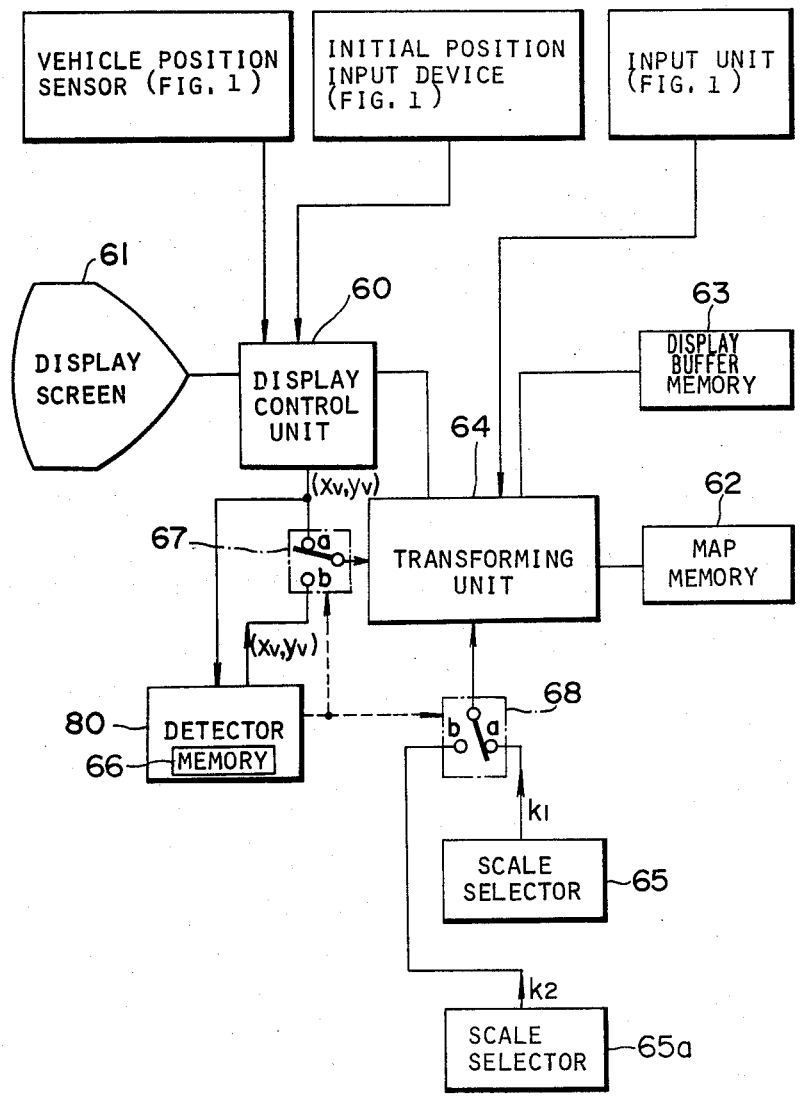
FIG. 24 is a clock diagram showing further details of the other embodiment of the present invention which detects a crossing and enlarges the map display.

FIG. 24 shows a modification of the foregoing embodiment of FIG. 23 which can detect crossing of roads and enlarge the map display. This embodiment is characterized in that the map is enlarged from the point before the crossing and the enlarged state is continued until the vehicle has moved a predetermined distance from the crossing.

That is, a detector 80 for detecting crossing of roads compares the data on the crossing stored in the memory 66 and the data on the vehicle position so that the switching means 68 is switched to the b terminal so as to change the magnification $k_2$ when the vehicle position is within a predetermined distance of the crossing.

Further, the detector 80 also switches a switching means 67 to the b terminal so that the signal indicating the detected crossing instead of the signal indicating the vehicle position is applied to the coordinates transforming unit 64 for use in transforming the coordinate systems in place of the signal for the vehicle position. Thus, the enlarged map about the crossing as the center is fixedly displayed so as to improve the visual stability of the map as the vehicle approaches the crossing.

Figure 25:
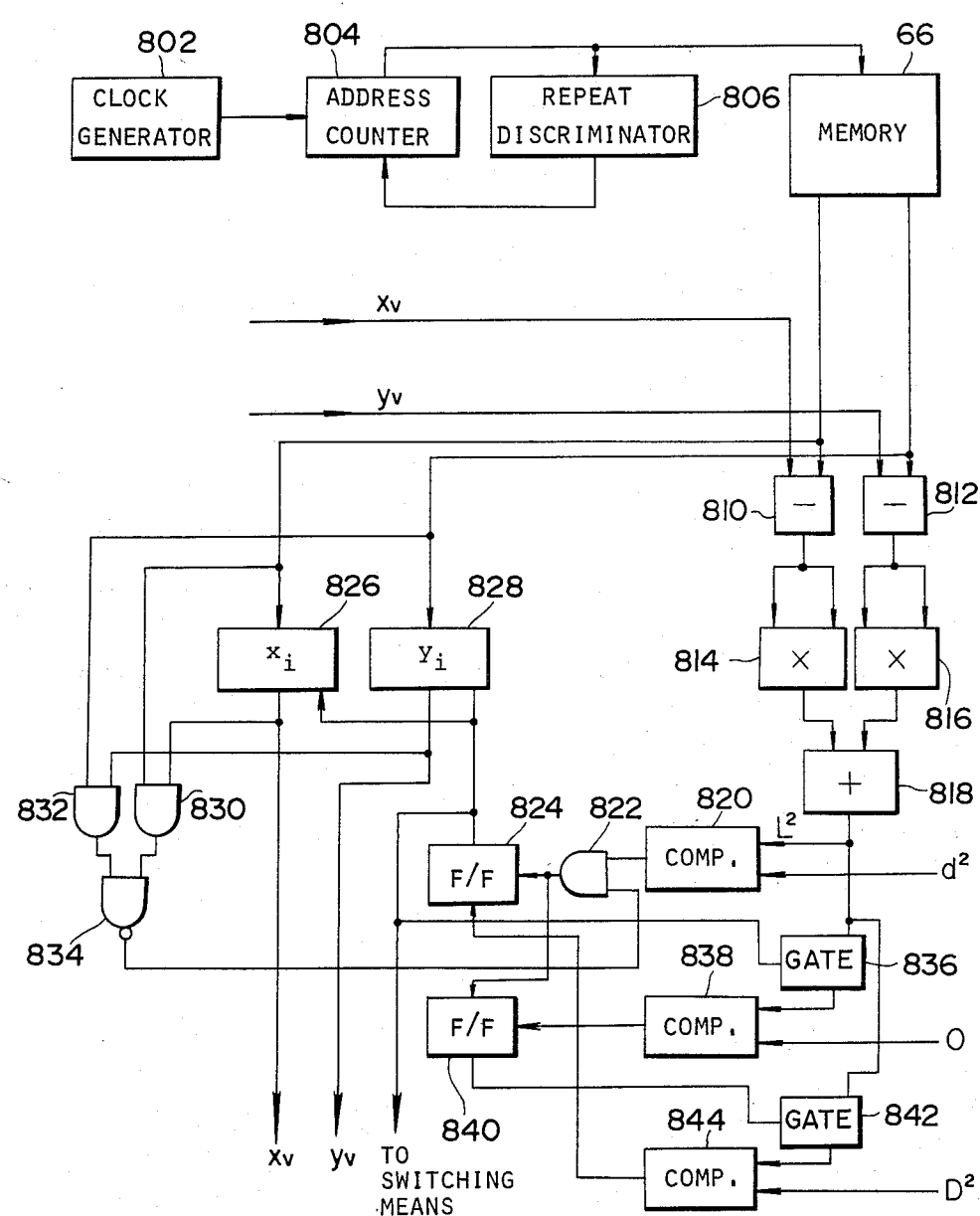
FIG. 25 is a block diagram showing an embodiment of the detector for detecting the crossing in FIG. 24.

In FIG. 25, a clock-generator 802 generates a clock-pulse by which an address counter 804 is incrementally actuated. According to the count address of the address counter 804, the data on crossings $x_i$ and $y_i$ (i=the index of the crossing such as 1, 2, 3, ---) stored in the memory 66 is sequentially read out. A repeat discriminator 806 monitors the address data from the address counter 804 so as to discriminate the final crossing address data for the memory 66 and send a reset signal to the address counter 804 to allow repeated access to the crossing data.

Signals $x_v$ and $y_v$ representing the current position of the vehicle are fed to subtractors 810 and 812 to subtract them from the data $x_i$ and $y_i$ so as to obtain the differences $(x_i-x_v)$ and $(y_i-y_v)$, respectively. The resulting differences are respectively squared by multipliers 814 and 816 and then, the resulting values are added by an adder 818 so that $L^2=(x_i-x_y)^2+(y_i-y_v)^2$ is obtained. Then, the resulting value is compared with a predetermined value $d^2$ by a comparator 820. When comparison shows that $L^2 \leq d^2$, the comparator 820 generates an H-level output and sets a flip-flop 824 through an AND gate 822. In response to the set output from the flip-flop 824, the data $x_i$ and $y_i$ on the crossing is latched by $x_i$-register 826 and $y_i$-register 828, respectively. A circuit comprising two AND gates 830 and 832 and a NAND gate 834 is provided as an auxiliary circuit for the latch-control of the $x_i$-register 826 and $y_i$-register 828. That is, when the contents latched by the $x_i$-register 826 and the $y_i$-register 828 are not equivalent to the data $x_i$ and $y_i$ from the memory 66, the NAND gate 834 output will be at H-level so as to allow the AND gate 822 to conduct. In response to the H-level output from the AND gate 834, the H-level output from the comparator 820 is applied to the flip-flop 824 so that the input data is latched by the $x_i$-register 826 and by $y_i$-register 828.

Thus, when the flip-flop 824 is set by the output from the comparator 820, this set signal is outputted to the switching means 67 and 68 as a switch signal. The data $x_i$ and $y_i$ latched by the $x_i$-register 826 and the $y_i$-register 828 are outputted as crossing data.

Further, the set output from the flip-flop 824 allows AND gate 836 to conduct so that the data $L^2$ outputted from the adder 818 is inputted into a comparator 838 so as to discriminate whether the condition $L^2 \leq O$ is satisfied. The comparator 838 generates an output when $L^2 \leq 0$ is realized; i.e., when the position of the vehicle coincides with the position of the crossing of roads. The output signal from the comparator 838 sets the flip-flop 840 so as to enable comparison of the distance L with respect to a predetermined distance $D^2$ by means of gate 842 and comparator 844. When $L^2>D2$ a signal from comparator 844 resets the flip-flop 824 to return the switching means 67 and 68 to their a positions.

Alternatively, when the data representing the same crossing already passed is read out again from the memory 66 within a predetermined distance from the passed crossing, the value $L^2$ calculated by the adder 818 will satisfy the relation $L^2 \leq d^2$. However, in this situation, since the latched contents (outputs) of the $x_i$-register 826 and the $y_i$-register 828 will coincide with the input data $x_i$ and $y_i$ so that the output from the NAND gate 834 will be L-level, the AND gate 822 will be rendered non-conductive so that the H-level output from the comparator 820 will not be applied to the flip-flop 824. Accordingly, this detector is so designed that the same data is latched for a predetermined distance after passing the crossing.

The operation of this embodiment is the same as that of FIG. 23 until the vehicle arrives at the crossing. However, the flip-flop 840 is set by the H-level output from the comparator 838 when the vehicle arrives at the crossing so that the formula $L^2=0$ is realized. Thus, the gate 842 is allowed to be in the actuated state. Furthermore, as the vehicle moves away from the crossing and the formula $L^2 \geq D^2$ is realized, the comparator 844 generates the H-level output so that the flip-flop 824 is reset. The latching state of the $x_i$-register 826 and the $y_i$-register 828 are released and the switching means 68 and 67 are changed to the a terminal.

Figure 26:
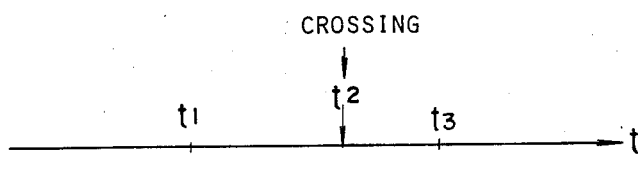
FIG. 26 is a timing chart showing operations for enlarging the map display as in FIGS. 22 and 24.
Figure 26:
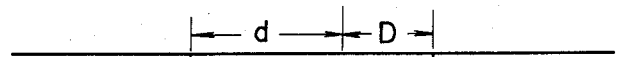

FIG. 26 shows the enlarging operations of the map display when the vehicle passes the crossing of roads according to the embodiment of FIGS. 22 and 23, and the embodiment of FIGS. 24 and 25. In both embodiments, the map is enlarged at time $t_i$ at the distance d before the crossing. However, in the former embodiment, the enlarged map returns to the first normal scale at time $t_2$ when the vehicle reaches the crossing. Alternatively, in the last embodiment, the enlarged map remains the same size until the vehicle is at least the predetermined distance D away from the crossing and returns to the normal scale at time $t_3$ so that it will be easy to confirm or check the course after passing the crossing.

As set forth above, the drive guide device for an automotive vehicle according to the present invention has superior effects since the device includes the use of a mark representing the position and orientation of the vehicle and which is a fixed symbol at a fixed place on the display screen of the device and the map displayed on the screen is moved in accordance with the movement of the vehicle. The device is so designed that the displayed map is enlarged or reduced by a predetermined magnification factor about the vehicle mark. Even when the vehicle is travelling on winding roads, the driver can easily check his course by enlarging the display map so that the vehicle can be safely driven. Further, even when the destination is located outside the map display, the driver can locate the destination on the screen by reducing the scale so that the driver can easily determine the direction of the destination and the roads leading to the destination. Additionally, since the map displayed is automatically enlarged when the vehicle comes near a predetermined crossing of roads, the driver can easily change direction or change roads. Furthermore, since the map is maintained in an enlarged state when the vehicle passes the crossing, the driver can easily confirm whether the course is correct or not. Legibility of the map is especially improved at a crossing when the map is enlarged about the crossing point as the center of magnification. In such a case, the movement of the display map is stopped since the fixed coordinates of the crossing take the place of the vehicle coordinates ($x_v$, $y_v$) in the map transformation and thus the legibility of map detail is improved as the vehicle approaches such a crossing.

What is claimed is:

1. A road map display system for an automotive vehicle comprising:
   a first memory storing road map data, said road map data defined on a first coordinate system;
   a sensor detecting displacement of the vehicle from a starting point and producing a first signal representative of vehicle orientation and position with respect to said first coordinate system;
   a scale selector responsive to said first signal for monitoring vehicle position and adjusting the scale of the map when the vehicle is within a predetermined distance of a preselected point on the map, said selector producing a second signal representative of the selected scale;
   means for transforming said map data in said first memory in response to said first and second signals for producing map data defined on a second coordinate system and for centering said transformed map data about said vehicle position;
   a second memory for storing said transformed map data; and
   a display unit for displaying at least part of the contents of said second memory and having on said second coordinate system a mark representing the position of the vehicle.

2. The system of claim 1, further comprising means for selecting a plurality of points of interest on the map and a third memory incorporated in said scale selector for storing the coordinates of said selected points in the first coordinate system, and wherein said scale selector adjusts the scale of the map when the vehicle is within the predetermined distance of any of said selected points.

3. The system of claim 2, wherein said scale selector enlarges the scale of the map from a first scale to a second scale as the vehicle approaches to within the predetermined distance of one of said selected points and then returns the scale of the map to the first scale when the vehicle reaches said one of said selected points.

4. The system of claim 2, wherein said scale selector enlarges the scale of the map from a first scale to a second scale as the vehicle approaches to within the predetermined distance of one of said selected points and then returns the scale of the map to the first scale after the vehicle has moved a second predetermined distance past said one of said selected points.

5. The system according to claim 1, wherein said sensor also detects the orientation of the vehicle in the first coordinate system and outputs a third signal indicative of said orientation, said transforming means producing data defined on a second coordinate system in response to said first, second, and third signals so that said mark also represents the orientation of the vehicle.

6. The system of claim 5, wherein the axes of the second coordinate system are aligned with axes of the display unit, one of the axes of the second coordinate system is parallel to the orientation of the vehicle, and the origin of the second coordinate system coincides with the center of the display unit.

7. The system of claim 6, wherein the origin of the second coordinate system also coincides with the vehicle position.

8. The system of claim 6, wherein the origin of the second coordinate system also coincides with said preselected point on the map when the vehicle is within said predetermined distance of said predetermined point and otherwise the origin of the second coordinate system coincides with the vehicle position.

9. A method for displaying a road map with an indication of vehicle position on said road map on a display screen, comprising the steps of:
   storing first map data of said road map with respect to a first coordinate system;
   detecting vehicle position and orientation in relation to said first coordinate system and producing a first signal representative of the vehicle coordinates in said first coordinate system;
   selecting a scale for the map to be displayed on said display screen in accordance with the distance between the vehicle and a preselected point on said road map;
   transforming said first map data with respect to a second coordinate system, said second coordinate system being aligned with the vehicle orientation and centered on the vehicle position, to obtain second map data;
   transforming said second map data with respect to said selected scale to obtain third map data; and
   displaying said third map data on said display screen with a vehicle position indication.

10. The method of claim 9, further comprising selecting a plurality of points of interest on the road map, storing the coordinates of said selected points in the first coordinate system, and as part of said scale selecting step, comparing the coordinates of each of said selected points with the current coordinates of the vehicle as indicated by the first signal.

11. The method of claim 10, wherein the map scale is increased from a first scale to a second scale when the vehicle approaches to within a predetermined distance of one of said selected points.

12. The method of claim 11, wherein the map scale is decreased from the second scale to the first scale when the vehicle position coincides with the position of one of said selected points.

13. The method of claim 11, wherein the map scale is decreased from the second scale to the first scale after the vehicle has moved a second predetermined distance past one of said selected points.

* * * * *